United States Patent
Focke et al.

(10) Patent No.: US 6,598,728 B1
(45) Date of Patent: Jul. 29, 2003

(54) APPARATUS FOR TRANSPORTING ARTICLES, IN PARTICULAR CIGARETTE GROUPS

(75) Inventors: Heinz Focke, Verden (DE); Burkard Roesler, Blender (DE)

(73) Assignee: Focke & Co. (GmbH & Co.), Verden (DE)

(*) Notice: Subject to any disclaimer, the term of this patent is extended or adjusted under 35 U.S.C. 154(b) by 0 days.

(21) Appl. No.: 09/656,300

(22) Filed: Sep. 6, 2000

(30) Foreign Application Priority Data

Sep. 17, 1999 (DE) .......................... 199 44 780

(51) Int. Cl.[7] ...................... B65G 25/00; B65G 29/00; B65G 37/00; B65G 47/84; B65G 47/30
(52) U.S. Cl. .............................. 198/418.6; 198/468.01; 198/468.07; 198/474.1
(58) Field of Search .......................... 198/418.5, 418.6, 198/468.01, 468.7, 474.1, 732

(56) References Cited

U.S. PATENT DOCUMENTS

| | | | |
|---|---|---|---|
| 2,888,125 A | 5/1959 | Engelson et al. | 198/20 |
| 3,198,316 A | 8/1965 | Bivans | 198/179 |
| 3,282,407 A | 11/1966 | Schmermund | 198/175 |
| 3,297,129 A * | 1/1967 | Lesch | 198/418.6 X |
| 3,902,587 A | 9/1975 | Checcucci | 198/34 |
| 4,169,341 A * | 10/1979 | Roetter et al. | 198/418.6 X |
| 4,181,213 A * | 1/1980 | Deutschlander et al. | 198/418.6 X |
| 4,417,653 A * | 11/1983 | Zwezerynen | 198/732 |
| 4,505,093 A * | 3/1985 | Johnson | 198/732 |
| 4,558,779 A * | 12/1985 | Schmitt et al. | 198/418.6 X |
| 4,682,684 A * | 7/1987 | Lothman | 198/732 |
| 5,350,055 A * | 9/1994 | Lecrone | 198/732 |
| 5,450,941 A * | 9/1995 | Loewenthal | 198/418.5 X |
| 6,131,725 A * | 10/2000 | Saito et al. | 198/844.1 |
| 6,260,690 B1 * | 7/2001 | Batzer | 198/732 |

FOREIGN PATENT DOCUMENTS

| | | |
|---|---|---|
| DE | 86 04 603 U | 9/1987 |
| DE | 39 32 3795 A1 | 4/1991 |
| EP | 446 480 A | 9/1991 |
| FR | 1 443 183 A | 6/1966 |

OTHER PUBLICATIONS

Deutsches Patent– und Markenamt Search Report Germany Jan. 11, 2001.
EPO Office Letter/Search Report Jun. 21, 2002.

* cited by examiner

*Primary Examiner*—Christopher P. Ellis
*Assistant Examiner*—Gene O Crawford
(74) *Attorney, Agent, or Firm*—Abelman, Frayne & Schwab

(57) ABSTRACT

For transporting sensitive articles, in particular cigarette groups, an endless conveyor (19,20) in the form of a toothed belt (21) is provided, carry-along elements (30) for gripping in each case one article being arranged on the same. The carry-along elements (30) are positively controlled such that, when an article is received and/or the movement direction is changed abruptly, an in particular rearwardly directed compensating movement of the carry-along elements takes place.

19 Claims, 8 Drawing Sheets

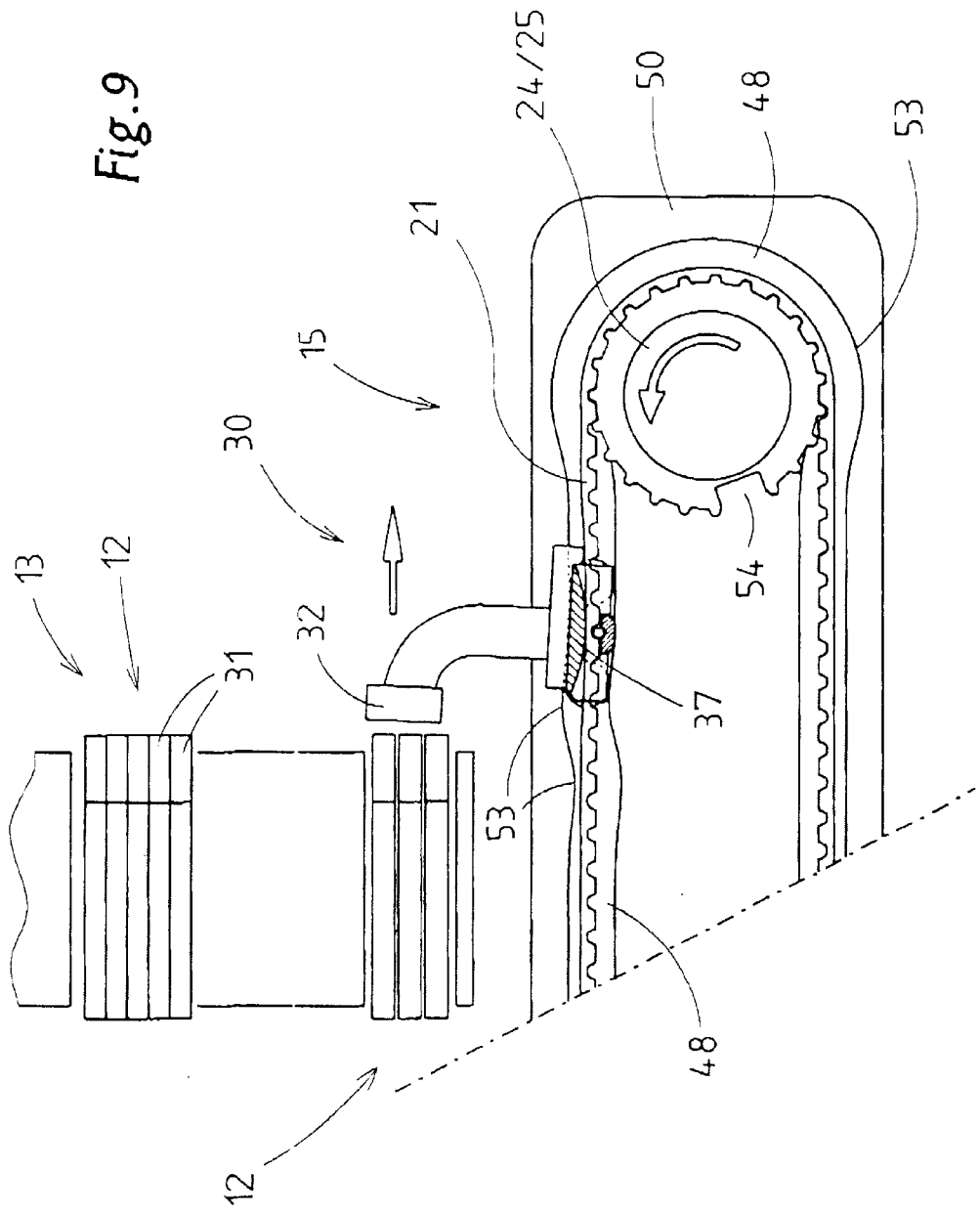

APPARATUS FOR TRANSPORTING ARTICLES, IN PARTICULAR CIGARETTE GROUPS

Figure 1:
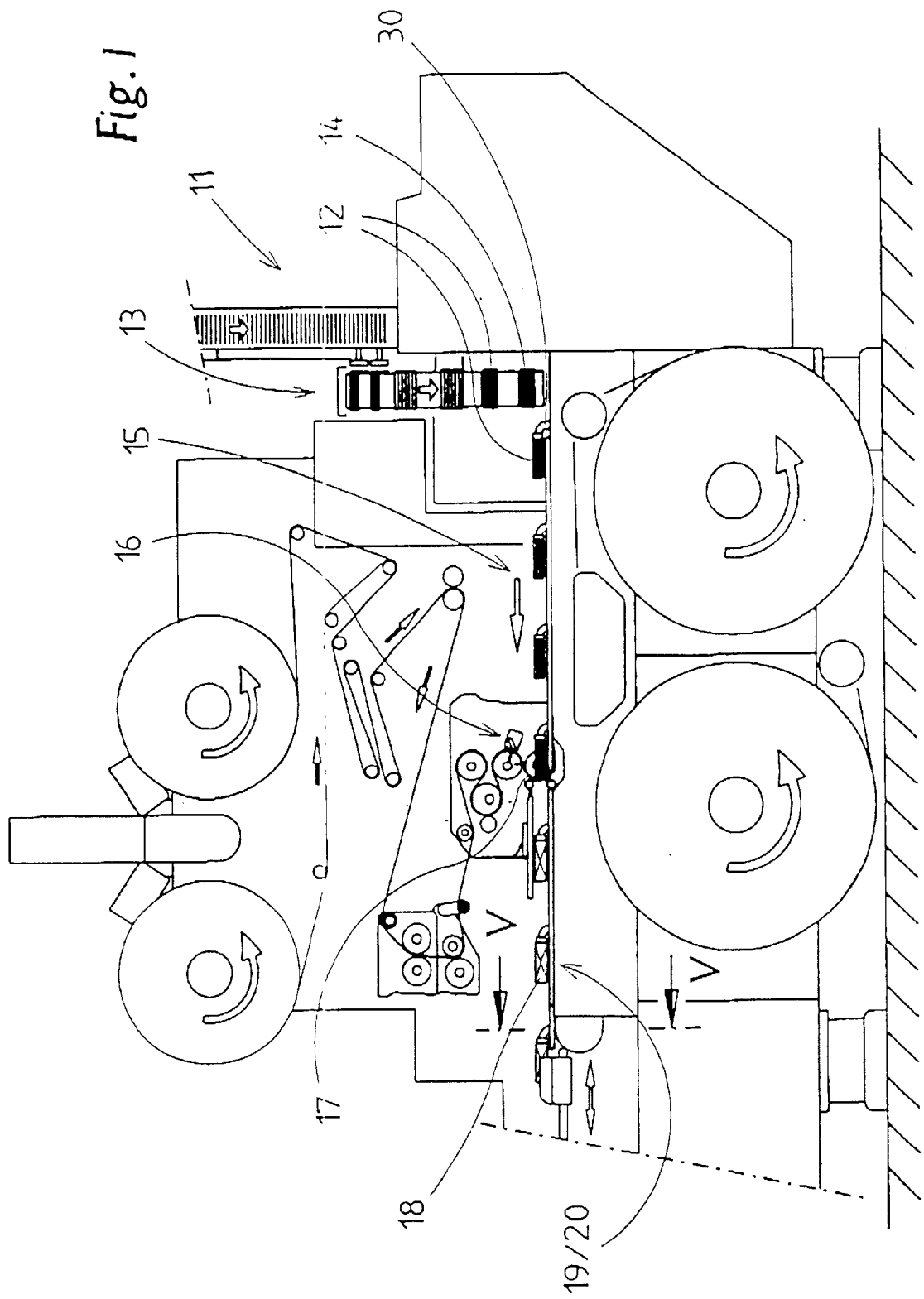

The invention relates to an apparatus for transporting articles, in particular cigarette groups, having an endless conveyor which has carry-along elements directed transversely to the conveying plane.

With operating speeds increasing, the transportation of sensitive articles, for example cigarette groups as the contents of a cigarette pack, is problematic. The articles or cigarette groups, which are gripped by carry-along elements, are subjected to the action of comparatively high forces at the moment they are received by a carry-along element of the conveyor. Likewise problematic are the forces which act on the conveyor and/or carry-along elements when the conveying direction is changed abruptly. In the case of an endless is conveyor, this applies, in particular, to the region of deflection around wheels, rollers or the like.

The object of the invention is to design and/or to control conveyors for sensitive articles such that forces which occur when articles which are to be transported are gripped and/or the movement direction changes (abruptly) are reduced.

In order to achieve this object, the apparatus according to the invention is characterized in that the carry-along elements are fastened moveably on the endless conveyor and can be moved relative to the endless conveyor by guide means such that, when an article is received and/or the direction of the endless conveyor is changed, the carry-along elements immediately execute a movement counter to the conveying direction and preferably, following that with a return movement corresponding to the conveying direction.

This configuration or operation of the conveyor achieves the situation where, the moment an article, for example a cigarette group, is received, the carry-along elements have a lower conveying speed and thus transmitted reduced forces to the article. Once the article has been received, the carry-along element is moved back into the starting or normal position. The procedure is similar when the carry-along elements, for example by virtue of deflection of the endless conveyor, undergoes an abrupt change in direction as it moves.

This is followed by the execution of a counter movement, thus a return movement of the carry-along element pointing in the conveying direction, which is effected by a corresponding configuration of the guide means.

In an advantageous embodiment, the endless conveyor is a belt conveyor, in particular a toothed belt, on the outside of which the carry-along elements are provided. Each carry-along element is fastened moveably, namely tiltably, on the (toothed) belt, a certain elastic deformability of the conveyor aiding the controlled compensating movements of the carry-along elements.

The movements of the latter are controlled by form-fitting guides, in particular by lateral, encircling guide grooves, in which guide rollers of the carry-along elements run during transportation. The shape and/or progression of the guide groove determines the relative movements of the carry-along elements.

The conveyor according to the invention is particularly advantageously suitable for transporting cigarette groups within a packaging machine for cigarettes. The articles or cigarettes, may be transported by carry-along elements or by pockets which are connected to the conveyor.

Figure 2:
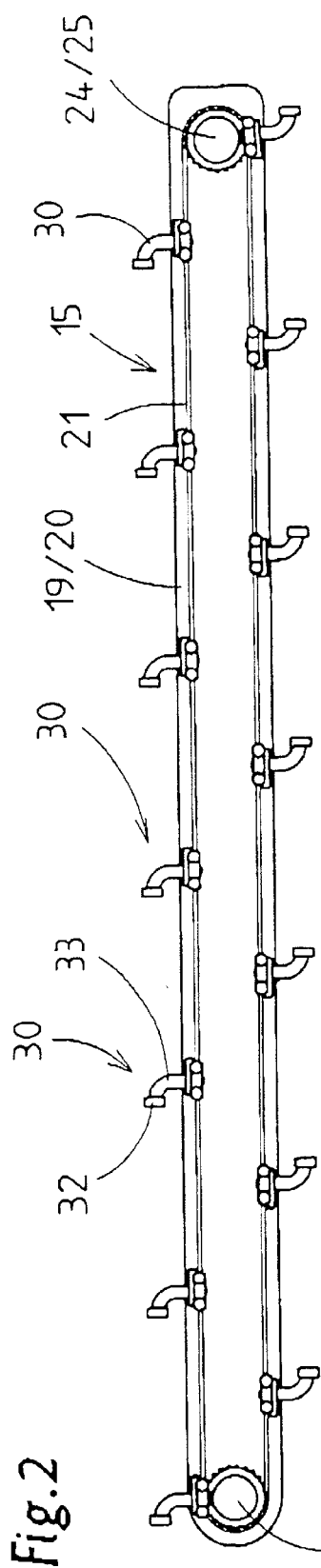
Figure 3:
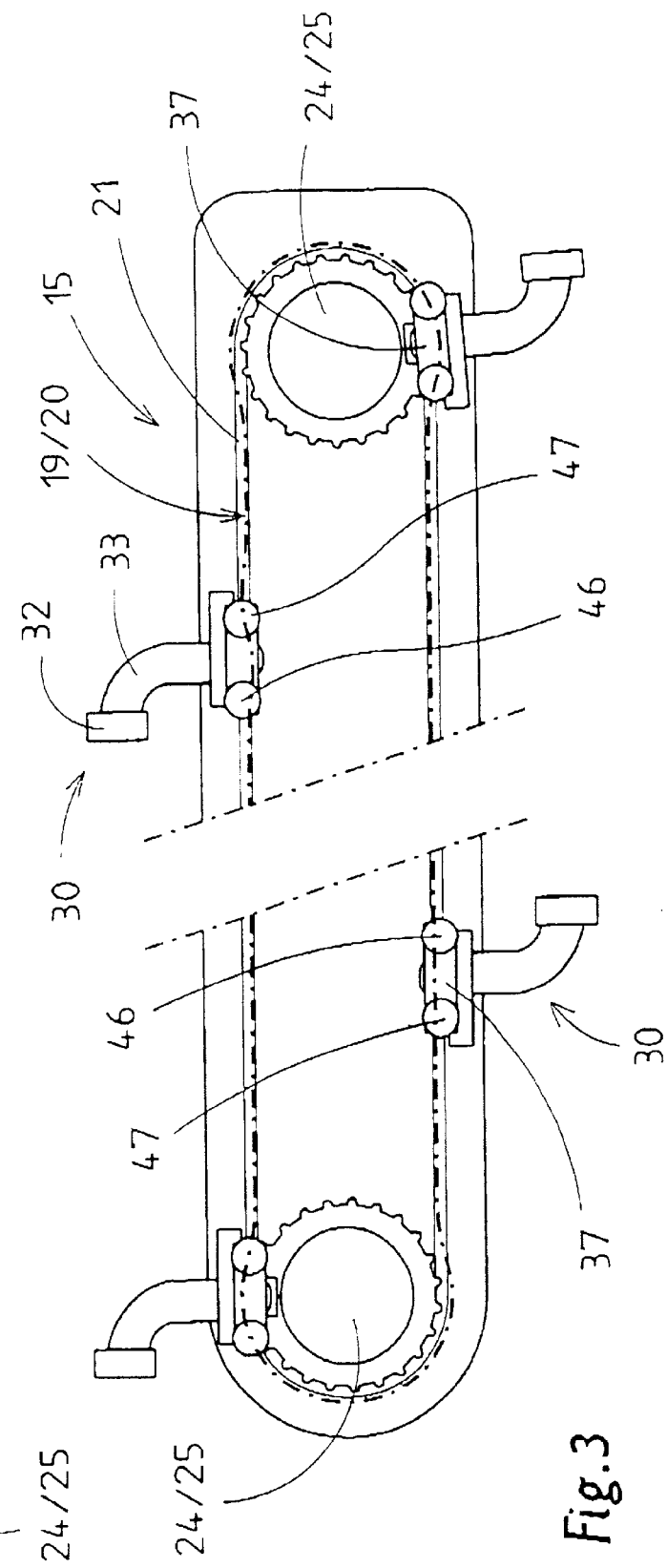
Figure 4:
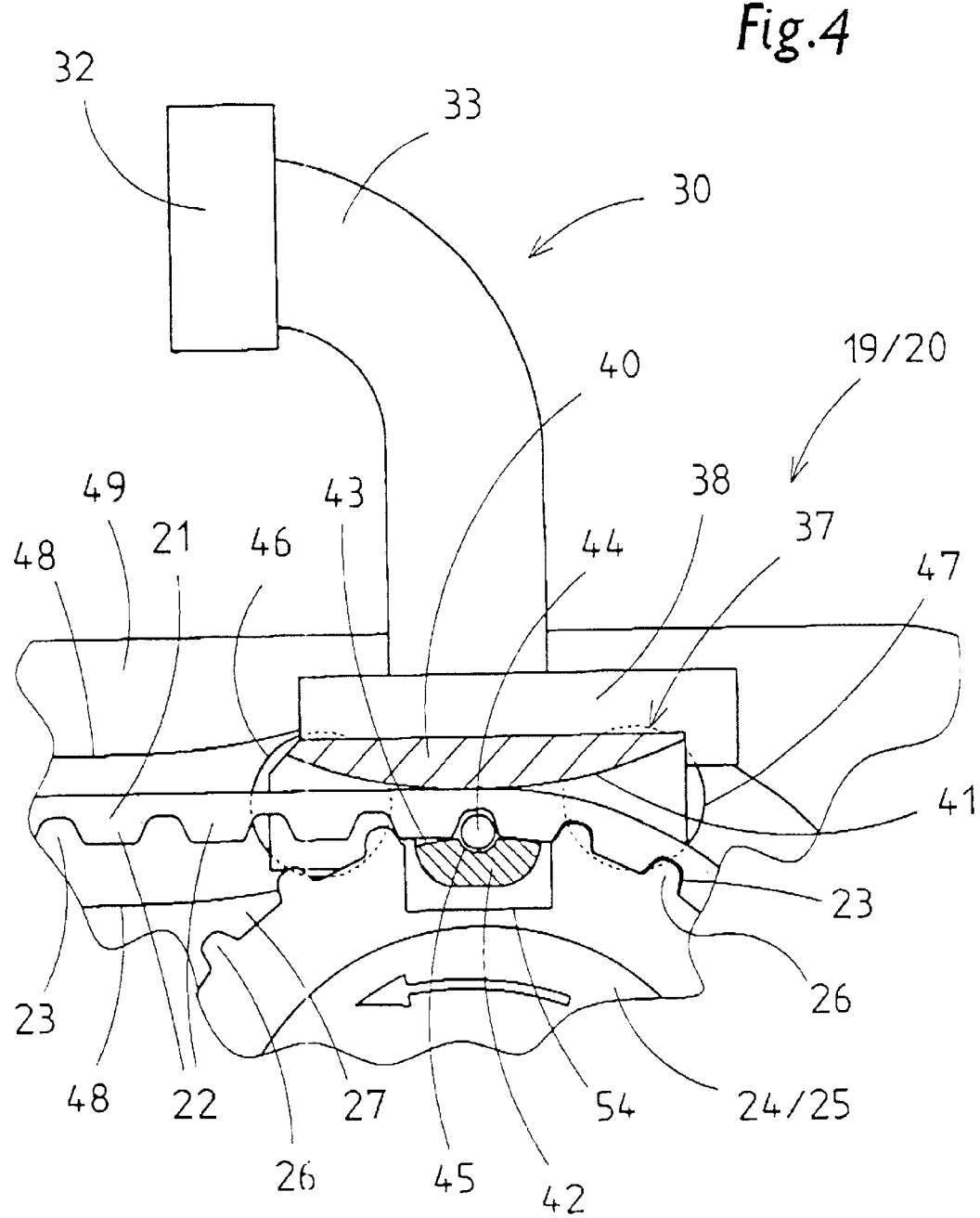
Figure 5:
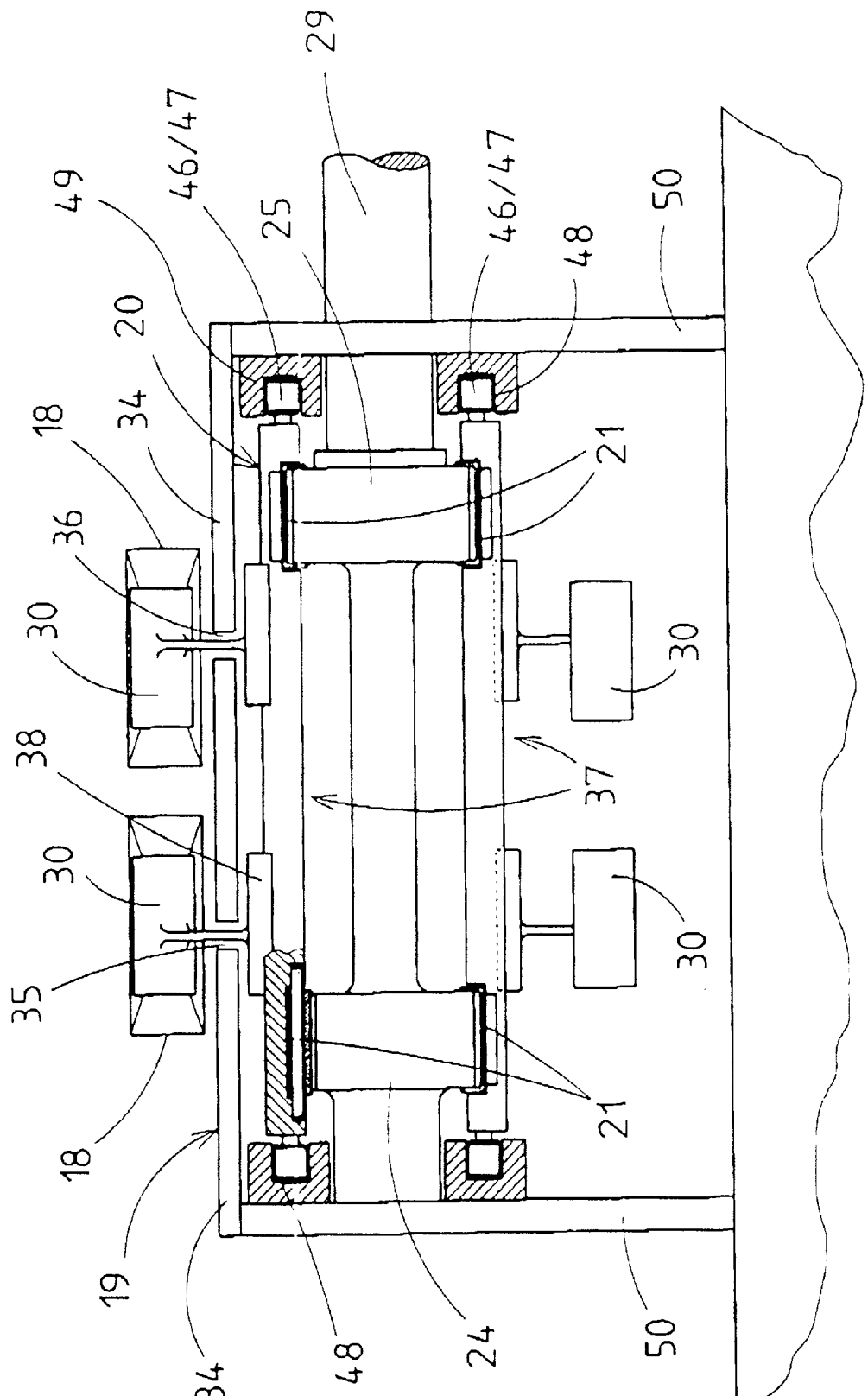
Figure 6:
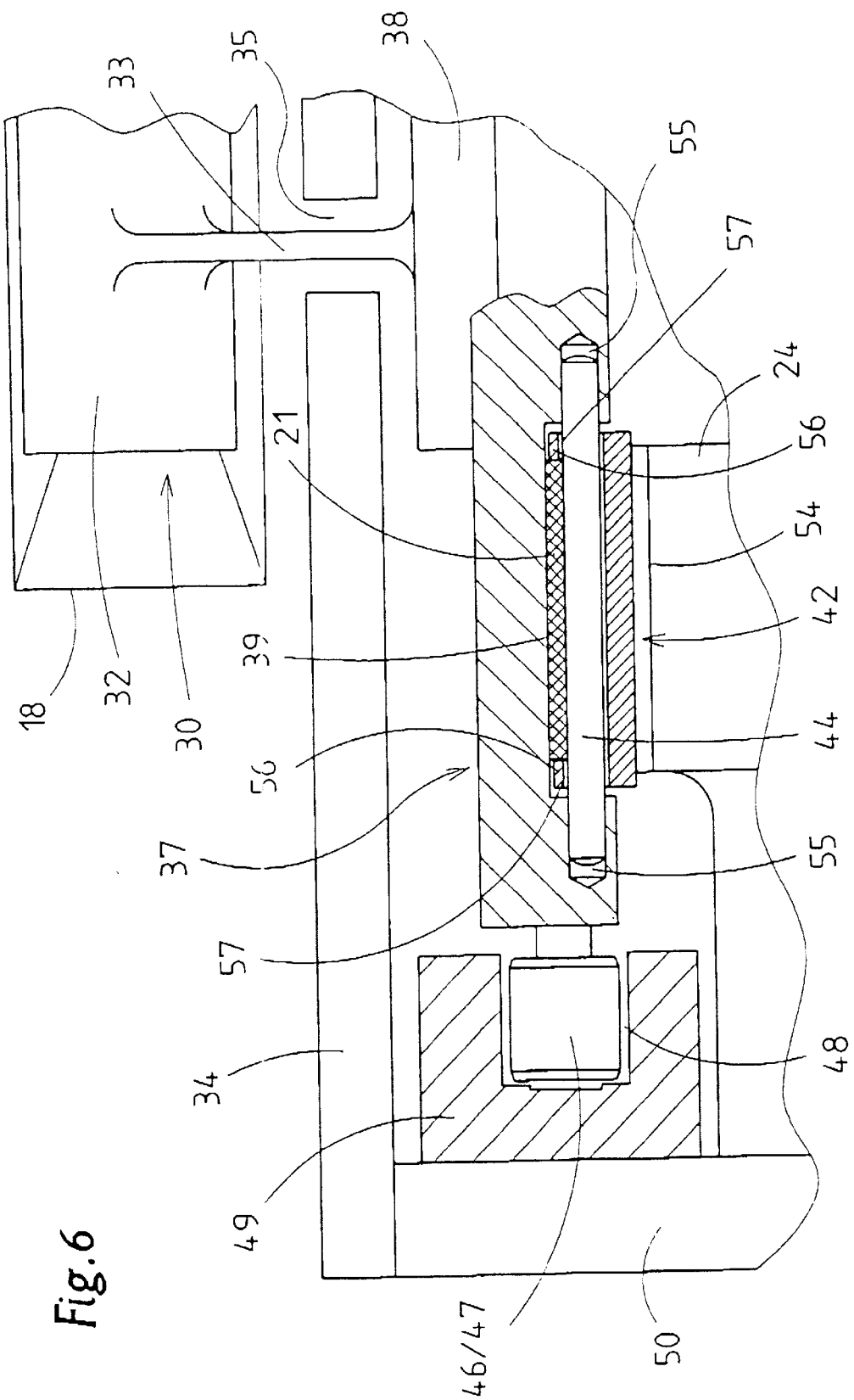
Figure 7:
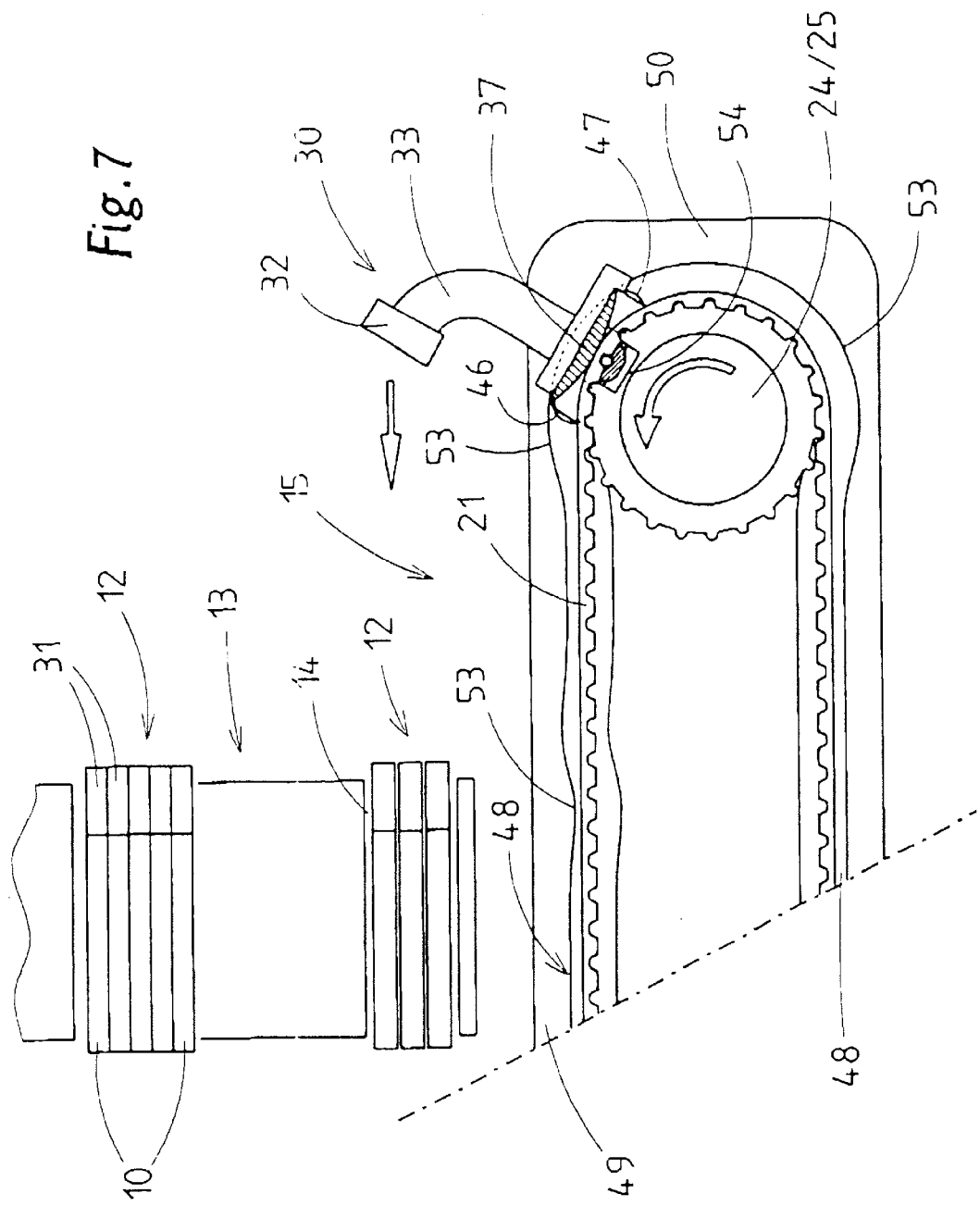
Figure 8:
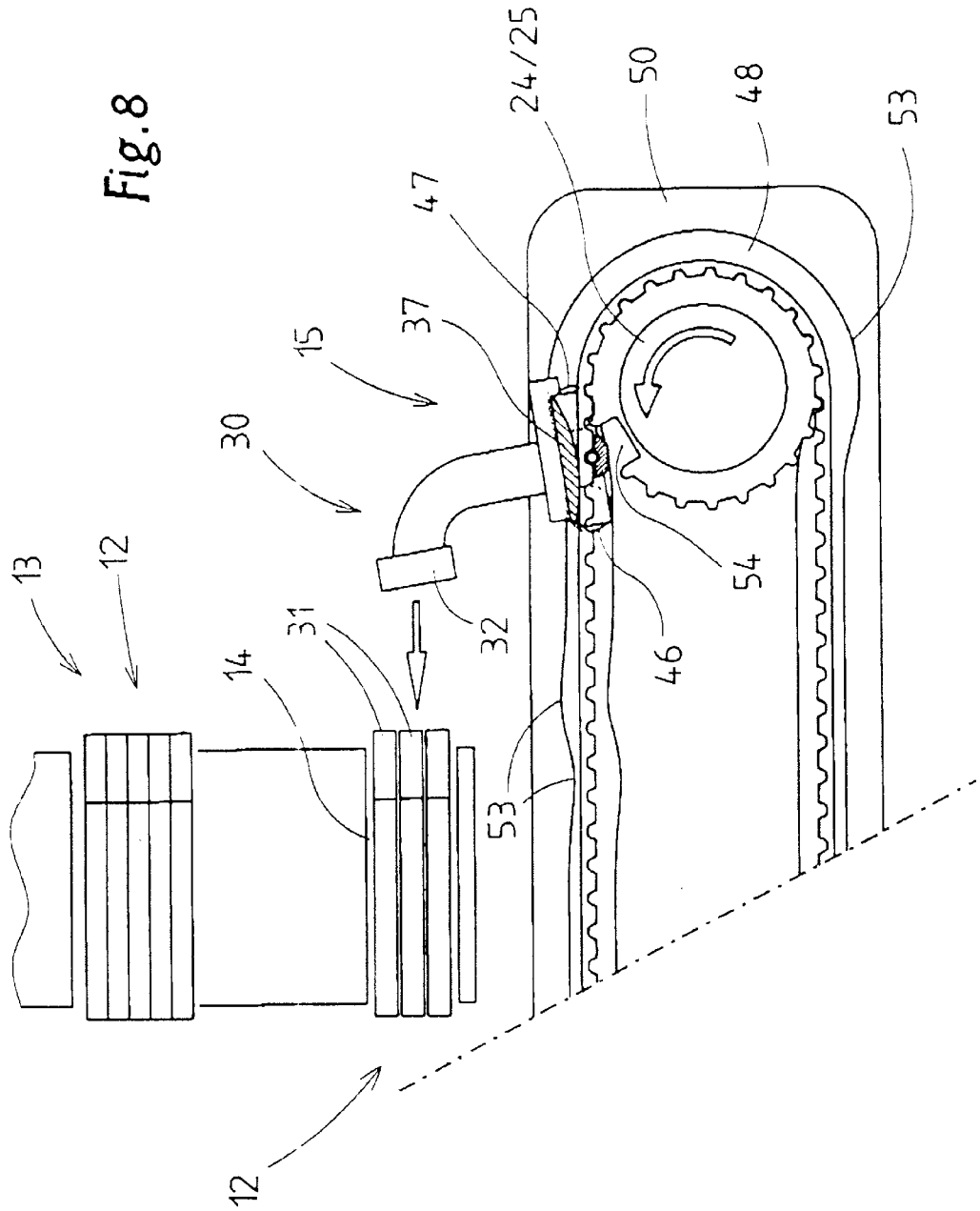

Further details and special features of the invention are explained in more detail below with reference to an exemplary embodiment of the apparatus illustrated in the drawings, in which:

FIG. 1 shows a schematic side view of part of a packaging machine for cigarettes, FIG. 2 shows a simplified side view of an endless conveyor, FIG. 3 shows, on an enlarged scale, a sub-region of the endless conveyor according to FIG. 2, FIG. 4 shows, on a vastly enlarged scale, a side view and/or cross-section of a detail of the (cigarette) conveyor, FIG. 5 shows, on a reduced scale, the conveyor according to FIG. 4 in rear view and/or in cross-section along section plane V—V from FIG. 1, FIG. 6 shows, on an enlarged scale, a detail of the illustration according to FIG. 5, FIG. 7 shows a side view, partially in section, of a region of a cigarette conveyor, FIG. 8 shows the detail according to FIG. 7 with elements in different positions relative to one another, and FIG. 9 shows an illustration corresponding to FIGS. 7 and 8 with a carry-along element in yet a different relative position.

The exemplary embodiment illustrated in the drawings concerns details of a packaging machine for cigarettes 10. FIG. 1 shows a sub-region of such a packaging machine. A cigarette magazine 11, from which cigarette groups 12 corresponding to the contents of a cigarette pack are removed, is typical. Following exit from the cigarette magazine 11, the cigarette groups 12 pass into a cigarette turret 13, which is driven cyclically in rotation in an upright plane and accommodates in each case one complete cigarette group 12 in pockets 14.

The cigarette groups 12 are fed to a cigarette conveyor 15. The latter transports the cigarette groups in a horizontal plane first of all to a first folding station 16, in the region of which an inner-wrapper blank 17 is folded around the cigarette group 12. The inner blank usually consists of tin foil or paper. In the present case, the cigarette blocks 18 formed in this way are transported further, by the same cigarette conveyor 15, to following folding subassemblies.

The cigarette conveyor 15 comprises an endless conveyor 19,20. In the exemplary embodiment illustrated, the apparatus is set up for doublepath operation. Accordingly, the cigarette conveyor 15 comprises two endless conveyors 19,20 which are located one beside the other, correspond in terms of movement sequences and each transport a cigarette group 12 or a cigarette block 18 (FIG. 3) on parallel paths.

The endless conveyors 19,20 are belt conveyors, to be precise designed as toothed belts 21. The toothed belt 21 is provided in each case with inwardly directed teeth 22 and tooth gaps 23 formed between these. Deflecting rollers or deflecting wheels 24,25 are designed correspondingly, that is to say with protrusions 26 and depressions 27 which correspond precisely, in terms of shape and arrangement, with the teeth 22 and tooth gaps 23 of the toothed belts 21. In the double-path configuration, the two deflecting wheels 24,25 are arranged on a common shaft 28. The latter is mounted at one end and, at another end, is provided with a drive shaft 29 for driving the endless conveyor 19,20.

The cigarette groups 12 or cigarette blocks 18 are conveyed by carry-along elements 30 which grip the article cigarette group 12/cigarette block 18—on its rear side. The cigarettes 10 are oriented in the conveying direction with a filter 31 oriented in the rearward direction. The carry-along element 30 comprises a head 32, which grips the article on the rear side, and a web 33 of arcuate design. The latter is connected (indirectly) to the endless conveyor 19,20. During transportation by the cigarette conveyor 15, the cigarette groups 12 or cigarette blocks, 18 rest with sliding action on a travel plate 34. In this case, the latter extends over the entire width of the cigarette conveyor 15. In the region of the movement path of the carry-along elements 30 and/or of the webs 33, slots 35,36 are arranged in the track plate 34, running in the conveying direction.

In this exemplary embodiment, the carry-along elements 30, rather than being connected directly to the endless conveyors 19,20, are connected to a transversely directed crossmember 37, which connects the two endless conveyors 19,20 to one another. In each case two carry-along elements 30 are fastened on each crossmember 37. The endless conveyors 19,20 have a plurality of spaced-apart crossmembers 37.

The carry-along elements 30 and/or their webs 33 are fastened, to be precise by way of an angled base 38, on the top side of the crossmember 37, which is designed essentially with a flat profile. The crossmember 37 is also of special design and is connected to the associated toothed belts 21.

The toothed belts are anchored on the crossmember 37 in the region of an indent 39. The connection is such that the carry-along element 30 can be moved relative to the endless conveyor 19,20, that is to say can be pivoted or tilted in the plane of the conveying direction. For this purpose, a supporting body 40 with convex abutment surface 41 is formed in the region of the indent of the crossmember 37, on the outside of the toothed belt 21. During tilting movements of the carry-along element 30, the abutment surface 41 rolls on the (smooth) outer surface of the toothed belt 21.

A steadying element 42 is provided on the opposite, inner, toothed side of the toothed belt. Said steadying element is designed as a separate molding and is connected (releasably) to the crossmember 37. The steadying element 42 presses the toothed belt 21 against the abutment surface 41 of the supporting body 40. In order to allow the described tilting movements of the carry-along element 30, that side of the steadying element 42 which is directed towards the toothed belt 21 is also provided with a convex or curved supporting surface 43. The supporting surface 43 butts against correspondingly planar-design surfaces of the teeth 22, namely of two adjacent teeth 22, of the toothed belt 21.

The steadying element 42 is likewise seated in the indent 39 of the crossmember 37 and is fastened thereon by a connecting means. The latter is a pin 44 of cylindrical shape. The pin 44 is dimensioned and arranged such that part of the cross section, namely approximately half, is positioned within a tooth gap 23 of the toothed belt 21. The other part, or the other half of the cross section, of the pin 44 is located in a hollow-like recess 45 of the steadying element 42. Accordingly, the central plane of the pin 44 is located relatively close to the neutral zone or plane of the toothed belt 21.

The pin 44 and steadying element 42 form an advantageous, exclusively form-fitting connection between elements and a toothed belt 21 with the geometrical shape of the toothed belt 21 being utilized in the process. The crossmember 37 is provided with bores 55 on both sides of the indent 39. Ends of the pin 44 pass into said bores. The steadying element 42 is of cross-sectionally U-shaped design in a sub-region, namely at the ends. Through-passage bores 57 are formed in the region of legs 56, and the pin 44 passes through said bores. The form-fitting (plug-in) connection between the toothed belt 21 and the crossmember 37 is created in this way.

The carry-along element 30, which is connected to the endless conveyor 19,20 or toothed belt 21 in the manner described, is intended to execute controlled compensating movements. Individual phases of the movements are shown by way of example in FIGS. 5 and 6. FIG. 4 shows a position of the carry-along element 30 in the region of the deflection of the endless conveyor 19,20. With the return from the deflection position into the horizontal conveying plane, considerable forces arise in the region of the carry-along elements 30 due to the abrupt change in angular velocity. In order to counter these forces, the carry-along element 30 is moved rearwards, that is to say counter to the conveying movement indicated by the arrow, in the transition region into the horizontal conveying plane. Passage; into the horizontal conveying plane (FIG. 4) is followed by an opposing, compensating tilting movement to the front in the conveying direction (FIG. 5). During these tilting movements, the abutment surface 41 rolls on the outside of the toothed belt 21 and the supporting surface 43 rolls on the inside, the latter on the planar surfaces of adjacent teeth 22.

In analogous fashion, an opposing movement, i.e. a counter or return movement in the conveying direction, is exerted on the carry-along element 30 so that afterwards the carry-along element assumes the correct relative position.

A particularly important compensating movement of the carry-along elements 30 is provided in the region where the cigarettes 10 or the cigarette group 12 are/is received. Immediately before the head 32 butts against the rear side of the cigarette group 12, the carry-along element 30 is moved rearwards, with the result that there is a reduction in the relative movement between the carry-along element 30 or head 32 on the one hand, and cigarette group 12 on the other hand. Following this, that is to say once the cigarette group 12 has been received by the carry-along element 30, the conveying movement is compensated first of all with a forwardly directed counter-movement and then continues with the (continuous) conveying movement of the cigarette conveyor 15.

The described compensating movements of the carry-along elements 30 are brought about by form-fitting guide elements. Each carry-along element 30 is assigned guide rollers. Two spaced-apart guide rollers 46,47 are arranged at the two ends of the crossmembers 37. The two guide rollers 46,47 run in common, lateral and stationary guides, namely in a guide groove 48. The latter is formed in a lateral, stationary structural part of the apparatus, namely in guide rails 49 which extend longitudinally on an upright housing wall 50. The guide grooves 48 run over the entire movement section of the carry-along elements 30, that is to say they extend in the region of a top strand, bottom strand and in the region of deflection and/or of the deflecting wheels, 24,25. The guide groove 48 is bounded by top and bottom and/or outer and inner) guide surfaces 51,52, on which the guide rollers 46,47 run.

In the region of the compensating movements of the carry-along elements 30, the guide groove 48 and/or the guide surfaces 51,52 have/has upwardly and/or downwardly or outwardly and/or inwardly directed curved bulges 53, which bring about the respectively desired movement of the carry-along elements 30. The bulges 53 are formed and/or positioned such that, at an increased predetermined speed of the carry-along elements 30, the latter are slowed down first of all in a tilting movement counter to the conveying direction and then are moved back into the starting position by an (oppositely directed) bulge 53. Accordingly, when a cigarette group 12 is carried along (FIG. 9), the guide rollers 46,47 run through first of all an upwardly directed bulge, in order to produce a rearward tilting movement, and then an oppositely directed bulge for a compensating movement, namely once the cigarette group 12 has been gripped.

The distances between the carry-along elements 30 may be selected as desired, but have to be adapted to the rotary movement of the (deflecting wheels 24,25. In the exemplary embodiment shown, the distance between successive carry along elements 30 corresponds to the circumference of the deflecting wheels 24,25. The latter are thus provided with an indent 54 into which the steadying element 42 passes during movement in the region of the deflecting wheels 24,25.

In the exemplary embodiment shown, the compensating movement of the carry-along element 30 is aided by an elastic deformability of the endless conveyors 19,20. However, it is also possible for the system to be used for endless conveyors designed in some other way. In this case, the connection between the carry-along elements and the endless conveyors has to be such that the compensating movement is absorbed exclusively in this region.

The configuration of the cigarette conveyor may also be applied to a pocket conveyor, namely to the region of the deflection of endless conveyors of the same. Furthermore, it is also possible for the abovedescribed connection of the carry-along elements and/or crossmembers to the toothed belt to be utilized in some other context.

What is claimed is:

1. Apparatus for transporting articles, the apparatus comprising:
   a track plate for supporting the articles on top of said track plate;
   a conveyor disposed underneath said track plate;
   carry-along elements secured to said conveyor for tilting movement relative to said conveyor, wherein said carry-along elements are disposed for engaging the articles supported on top of said track plate and moving the articles along said track plate as said conveyor moves said carry-along elements in a conveying direction,
   each said carry-along element including a transverse support structure having a convex abutment surface abutting an outer surface of said conveyor; and
   stationary guides for cooperating with said support structures of said carry-along elements as said carry-along elements move in the conveying direction to tilt said carry-along elements on their respective abutment surfaces parallel to the conveying direction, said stationary guides causing each said carry-along element to make a temporary compensating tilting movement counter to the conveying direction as an article is initially contacted by said carry-along element and a subsequent return tilting movement in the conveying direction.

2. Apparatus as in claim 1, wherein said conveyor is an endless conveyor.

3. Apparatus as in claim 2, wherein each said support structure includes a crossmember transverse to the conveying direction having said convex abutment surface thereon positioned on an outer side of said conveyor for permitting tilting movement of said carry-along member, said support structure further having a steadying element opposed to said abutment surface on an inner side of said conveyor for fastening said crossmember to said conveyor.

4. Apparatus as in claim 3, wherein each said steadying element is connected releaseably to the respective crossmember by a connecting pin with said connecting pin butting against said inner side of said conveyor facing said steadying element.

5. Apparatus as in claim 2, wherein each said transverse support structure includes opposed ends and wherein said stationary guides comprise opposed stationary guide grooves extending along an entire path of movement of said carry-along elements for respectively receiving said opposed ends of said support structures of said carry-along elements along the entire path as said carry-along elements move in the conveying direction, said guide grooves being shaped to cause each said carry-along element to make its tilting movements.

6. Apparatus as in claim 5, wherein each said support structure includes a crossmember directed transverse to said conveyor and having lateral ends, and two guide rollers attached at said lateral ends and arranged at a distance from one another in the conveying direction, said guide rollers being received in respective ones of said guide grooves, and
   wherein said carry-along elements are attached to said conveyor by means of respective webs, each carry-along element or its respective web being pivotably attached to said conveyor with said crossmembers.

7. Apparatus as in claim 5, wherein each said support structure includes a crossmember transverse to the conveying direction having said convex abutment surface thereon positioned on an outer side of said conveyor for permitting tilting movement of said carry-along member, said support structure further having a steadying element opposed to said abutment surface on an inner side of said conveyor for fastening said crossmember to said conveyor.

8. Apparatus as in claim 7, wherein each said steadying element is connected releaseably to the respective crossmember by a connecting pin with said connecting pin butting against said inner side of conveyor facing said steadying element.

9. Apparatus for transporting articles, the apparatus comprising:
   a track plate for supporting the articles on top of said track plate;
   an endless conveyor disposed underneath said track plate;
   carry-along elements secured to said conveyor for tilting movement relative to said conveyor, wherein said carry-along elements are disposed for engaging the articles supported on top of said track plate and moving the articles along said track plate as said conveyor moves said carry-along elements in a conveying direction,
   each said carry-along element including a transverse support structure having opposed ends; and
   opposed stationary guide grooves extending along an entire path of movement of said carry-along elements for respectively receiving said opposed ends of said support structures of said carry-along elements along the entire path as said carry-along elements move in the conveying direction, said guide grooves being shaped to cause each said carry-along element to make a temporary compensating tilting movement counter to the conveying direction as an article is initially contacted by said carry-along element and a subsequent return tilting movement in the conveying direction.

10. Apparatus as in claim 9, wherein in a deflection region of said guide grooves at which said guide grooves are shaped to cause tilting movement of said carry-along elements, said guide grooves include an outwardly directed, radially concave surface that extends across all of the deflection region, said opposed ends of said support structures bearing against the respective concave surfaces such that each said carry-along member executes the compensating tilting movement upon entering the deflection region, and such that each said carry-along member executes the return tilting movement upon leaving the deflection region.

11. Apparatus as in claim 9, wherein said conveyor comprises an endless toothed belt extending around a toothed wheel at each end of a conveying path.

12. Apparatus as in claim 9, wherein each said support structure includes a crossmember directed transverse to said conveyor and having lateral ends, and two guide rollers attached at said lateral ends and arranged at a distance from one another in the conveying direction, said guide rollers being received in respective ones of said guide grooves, and wherein said carry-along elements are attached to said conveyor by means of respective webs, each carry-along element or its respective web being pivotably attached to said conveyor with said crossmembers.

13. Apparatus as in claim 9, wherein said apparatus operates in a double-track operation wherein two of said conveyors are parallel and spaced apart, each provided with respective ones of said carry-along elements, said two conveyors being driven in a synchronous fashion and being connected to each other by said cross-members in a region of each said carry-along element.

14. Apparatus as in claim 9, wherein said conveyor is deflected in a deflection region in passing over a deflection wheel and wherein said guide grooves are shaped to cause each said carry-along element to make one of the compensating tilting movement and the return tilting movement when the conveying direction of the respective carry-along element is changed by the deflection of said conveyor.

15. Apparatus as in claim 14, wherein in the deflection region, said guide grooves include an outwardly directed, radially concave surface that extends across all of the deflection region, said opposed ends of said support structures bearing against the respective concave surfaces such that each said carry-along member executes the compensating tilting movement upon entering the deflection region, and such that each carry-along member executes the return tilting movement upon the deflection region.

16. Apparatus as in the claim 9, wherein each said support structure includes a crossmember transverse to the conveying direction having a convex abutment surface on an outer side of said conveyor for permitting tilting movement of said carry-along member said support structure further having a steadying element opposed to said abutment surface on an inner side of said conveyor for fastening said crossmember to said conveyor.

17. Apparatus as in claim 16, wherein said steadying element is connected releasably to the respective crossmember by connecting in with said connecting pin butting against said inner side of said conveyor facing steadying element.

18. Apparatus as in claim 17, wherein conveyor is configured as toothed belt with inwardly pointing teeth, and each said steadying element is positioned on said inner side of said conveyor such that the respective connecting pin fits in a tooth gap of said toothed belt arranged approximately in a neutral zone of said toothed belt.

19. Apparatus as in claim 18, wherein said conveyor includes a deflection wheel over which said toothed belt runs, said deflection wheel having projections on its circumference which correspond to and enter tooth gaps of said toothed belt, said deflection wheel further having radial depressions into which said steadying elements enter.

* * * * *